(12) United States Patent
Schoenfelder (10) Patent No.: US 8,790,199 B2
(45) Date of Patent: Jul. 29, 2014

(54) RADIAL DIAPHRAGM SPRING CLUTCH

(76) Inventor: Ray Schoenfelder, Zumbrota, MN (US)

(*) Notice: Subject to any disclaimer, the term of this patent is extended or adjusted under 35 U.S.C. 154(b) by 410 days.

(21) Appl. No.: 13/093,241

(22) Filed: Apr. 25, 2011

(65) Prior Publication Data

US 2011/0263363 A1  Oct. 27, 2011

Related U.S. Application Data

(60) Provisional application No. 61/328,038, filed on Apr. 26, 2010.

(51) Int. Cl.
*F16H 55/56* (2006.01)

(52) U.S. Cl.
USPC .......................................................... 474/12

(58) Field of Classification Search
USPC ................. 474/19, 20, 21, 118, 119, 101; 192/89.21, 89.22, 89.23, 89.24, 89.25; 384/620, 622
See application file for complete search history.

(56) References Cited

U.S. PATENT DOCUMENTS

| | | | |
|---|---|---|---|
| 3,786,688 A | 1/1974 | Svenson | |
| 3,869,932 A | 3/1975 | Fletcher | |
| 4,023,425 A | 5/1977 | Parker | |
| 4,624,651 A | 11/1986 | Jaccod | |
| 5,253,730 A | 10/1993 | Hayashi et al. | |
| 5,967,286 A | 10/1999 | Hokanson et al. | |
| 6,017,285 A | 1/2000 | Yasuhara et al. | |
| 6,248,035 B1 * | 6/2001 | Bartlett | 474/13 |
| 6,478,701 B1 * | 11/2002 | Yasuhara et al. | 474/12 |
| 6,502,479 B1 | 1/2003 | Lee | |
| 6,585,615 B2 | 7/2003 | Uota | |
| 6,860,826 B1 | 3/2005 | Johnson | |
| 7,037,226 B2 | 5/2006 | Zulawski | |
| 7,338,398 B2 | 3/2008 | Whiting et al. | |
| 7,611,005 B2 | 11/2009 | Uenohara | |
| 7,686,148 B2 | 3/2010 | Yetzke | |
| 2012/0103750 A1 * | 5/2012 | Sakamoto et al. | 192/84.7 |

* cited by examiner

*Primary Examiner* — William E Dondero
*Assistant Examiner* — Diem Tran
(74) *Attorney, Agent, or Firm* — Westman, Champlin & Koehler P.A.; Z. Peter Sawicki; Amanda M. Prose (57) ABSTRACT

A clutch includes a stationary sheave, a cam attached to the stationary sheave, and a movable sheave that is axially movable relative to the stationary sheave along the cam. A thrust bearing includes an outer race and an inner race, wherein the outer race is attached to the cam. A first radial spring includes a radially outward annular portion and an radially inward finger portion, wherein the radially outward annular portion is mounted on the movable sheave and wherein the radially inward finger portion bears against the inner race. In another aspect, a clutch includes a stationary sheave, a cam attached to the stationary sheave, and a movable sheave that is axially and rotationally movable relative to the stationary sheave along the cam.

20 Claims, 7 Drawing Sheets

RADIAL DIAPHRAGM SPRING CLUTCH

CROSS-REFERENCE TO RELATED APPLICATION

This application claims the benefit of priority from U.S. Provisional Application Ser. No. 61/328,038, entitled "Radial diaphragm spring clutch," filed Apr. 26, 2010, which is fully incorporated by reference herein.

BACKGROUND

Various relatively small motorized vehicles, such as snowmobiles, all-terrain vehicles (ATV's), tractors, motor scooters, go-carts and golf carts use an endless belt type continuously variable transmission (CTV). Variable transmissions include a variable-input drive/driving/primary pulley or clutch and an output driven/secondary pulley or clutch. The drive pulley is connected to the crankshaft of the engine. The driving pulley is also called the input pulley because it is where the energy from the engine enters the transmission. The second pulley is called the driven pulley because the first pulley is turning it. As an output pulley, the driven pulley transfers energy to the drive shaft of the track drive. Each pulley is composed of a fixed sheave or pulley half that is fixed in the axial direction, and a movable sheave or pulley half, which is movable in the axial direction. A high power metal or rubber belt, such as a V-belt, joins the drive pulley and the driven pulley and rides in the groove between the two sheaves. When the two sheaves of the pulley are far apart, the belt rides lower in the groove, and the radius of the belt loop going around the pulley gets smaller. When the sheaves are close together, the belt rides higher in the groove, and the radius of the belt loop going around the pulley gets larger.

Thus, the effective radius of both the primary and the secondary pulley is variable. The ratio of the primary pulley radius to the secondary pulley radius determines the ratio of engine rotational speed to the secondary shaft rate of rotation. When the primary clutch radius is smaller than the secondary clutch radius, the secondary shaft will turn at a rate that is slower than the engine speed, resulting in a relatively low vehicle speed. As the ratio of the primary and the secondary clutch radius approaches 1:1, the secondary shaft speed will be approximately equal to the engine or crankshaft speed. As the primary pulley radius becomes greater than the radius of the secondary clutch, an overdrive condition exists in which the secondary shaft is turning at a greater rate than the engine crankshaft. CVT's may use hydraulic pressure, centrifugal force or spring tension to create the force necessary to adjust the pulley halves.

When one pulley increases its radius, the other decreases its radius to keep the belt tight. As the two pulleys change their radii relative to one another, they create an infinite number of gear ratios—from low to high and everything in between. For example, when the pitch radius is small on the driving pulley and large on the driven pulley, then the rotational speed of the driven pulley decreases, resulting in a lower gear. When the pitch radius is large on the driving pulley and small on the driven pulley, then the rotational speed of the driven pulley increases, resulting in a higher gear. Thus, in theory, a CVT has an infinite number of gears through which it can run at any time, at any engine speed or at any vehicle speed.

These variable transmissions are equipped with a speed or revolution per minute (RPM) responsive mechanism associated with the drive pulley and a torque responsive mechanism associated with the driven pulley. Therefore, the drive pulley and the driven pulley continuously vary the shift ratio in relation to the drive speed and the driven torque.

The primary clutch is connected to the power source and in theory has the job of maintaining the engine's RPM at a value where the most power is being produced by the engine. The primary clutch may also control engagement and disengagement of the engine from the load in order to stop and start vehicle movement. In the case of a snowmobile, the secondary or driven clutch is connected to the load through a jackshaft, gears, chain and track, and functions to change the ratio of the two clutches as the load varies. This function is performed by a torque sensing helix or the like, that is typically considered part of the secondary clutch. An example of a secondary clutch having a torque sensing helix is disclosed in U.S. Pat. No. 5,516,333.

As the load to the secondary clutch fluctuates, the torque sensing helix will balance the power being received from the engine and the load by widening or narrowing the distance between the clutch sheaves. Altering the distance between the clutch sheaves changes an effective radius of the clutch around which the drive belt travels. The torque sensing helix is intended to automatically make widening and narrowing adjustments (upshifts and downshifts) almost instantaneously.

The torque sensing helix is essentially a plurality of cam slots formed in a clutch housing. Each cam slot includes cam surfaces that engage associated cam followers that transfer the adjustments made by the torque sensing helix into variations of width between the clutch sheaves. The fixed sheave of the pulley is typically secured to the secondary shaft that transfers a load to and from the vehicle's track or wheels. The clutch housing, including the torque sensing helix is secured to the movable sheave and retains a compression/torque spring against the fixed sheave. The compression/torque spring acts between an end of the housing and the fixed sheave, and is typically adjustable within the housing. The fixed sheave typically has cam followers secured to it that engage the cam surfaces of the torque sensing helix housing. As the torque sensing helix senses a change in load from the secondary shaft, the moveable sheave of the driven clutch will move to either compress or relax the compression spring, causing the cam followers to move up or down the cam surfaces of the helix housing to increase or decrease the radius of the driven clutch.

Thus, when the torque load upon the driven shaft is increased with the increase in the load upon the drive track, as when the vehicle runs uphill, the torque responsive mechanism transmits an axial force matching that increase from the driven pulley to the drive pulley so that a satisfactory shift ratio can always be attained.

The linear, axial movement of the movable sheave with respect to the fixed sheave forms a variable diameter pulley. The linear motion of the sheave along the pivot is controlled by the speed of rotation of the pulley, torque on the transmission belt, and resistance from helical compression springs opposing the linear motion.

One disadvantage with helical compression springs is that they have only a single spring constant, making it difficult to tune for different operating conditions. Another disadvantage with helical compression springs is that they require a relatively large axial dimension to accommodate the spring's minimum depth. Another disadvantage with helical compression springs is that some rotation or twisting occurs during their operation, thereby increasing friction, wear and noise.

BRIEF SUMMARY

In one aspect, a clutch is described comprising a stationary sheave, a cam attached to the stationary sheave, and a movable sheave that is axially movable relative to the stationary sheave along the cam. A thrust bearing comprises an outer race and an inner race, wherein the outer race is attached to the cam. A first radial spring comprises a radially outward annular portion and an radially inward finger portion, wherein the radially outward annular portion is mounted on the movable sheave and wherein the radially inward finger portion bears against the inner race.

In another aspect, a clutch is described comprising a stationary sheave, a cam attached to the stationary sheave, and a movable sheave that is axially and rotationally movable relative to the stationary sheave along the cam.

BRIEF DESCRIPTION OF THE DRAWINGS

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. Moreover, where terms such as above, below, over, under, top, bottom, side, right, left, etc., are used, it is to be understood that they are used only for ease of understanding the description. It is contemplated that structures may be otherwise oriented.

DETAILED DESCRIPTION OF ILLUSTRATIVE EMBODIMENTS

The present disclosure is applicable to clutches, for example, driven clutches for a variable speed belt drive transmission. The clutch of the present disclosure overcomes many of the shortcomings of the prior art by requiring less space, decreasing weight, allowing for easier and less expensive manufacture, reducing rotation, and reducing friction, wear and noise.

Weight and space reduction are issues for various vehicles. For example, weight savings are important in snowmobiling for handling reasons, and space savings can be important in ATV's and scooters to increase performance and reduce drag.

An exemplary clutch uses a radial diaphragm spring disposed between a thrust bearing and a movable sheave. As the movable sheave moves axially and rotationally with respect to a fixed sheave, a plurality of cam followers move in helical slots on a cam that connects the movable sheave and the fixed sheave.

One example of a clutch 10 of the present disclosure includes a frusto-conical movable sheave 12 and a frusto-conical fixed sheave 14. The movable sheave 12 includes depressions 16 opposite belt surface 18. Fixed sheave 14 includes depressions 20 opposite belt surface 22 and cam 24 (cooperating with cam followers 26). Cam 24 includes cam slots 28, within which cam followers 26 move.

Depressions 16, 20 provided in movable and fixed sheaves 12, 14 allow for weight reduction of the sheaves 12, 14 and for savings in materials. Depressions 16, 20 also improve performance of the sheave 12, 14, by, for example, enhancing heat transfer from the sheave 12, 14. The design and number of depressions 16, 20 may vary to improve heat transfer while providing structure to the sheave 12, 14. For example, the thicker areas between the plurality of depressions 16, 20 are positioned to strengthen the sheave 12, 14 against deformation or failure.

Figure 1:
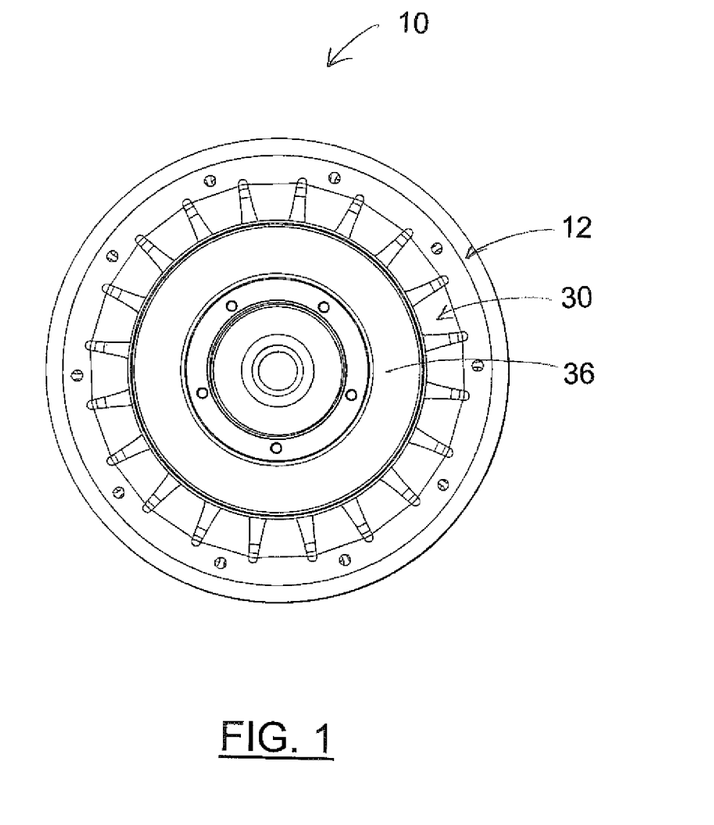
FIG. 1 is a plan view of an exemplary clutch, viewing the movable sheave side.
Figure 2:
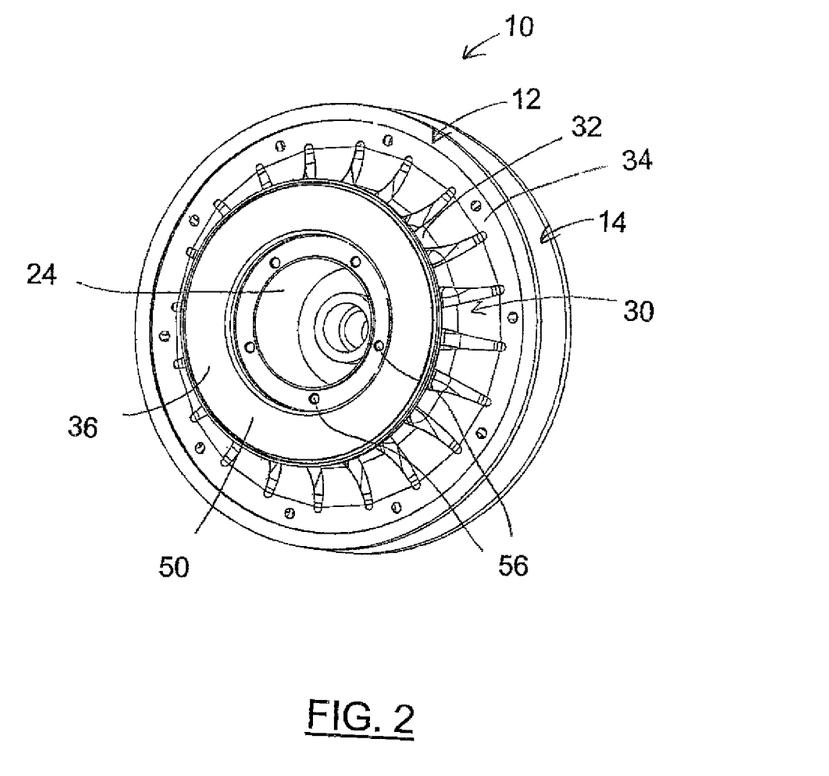
FIG. 2 is a perspective view of an exemplary clutch, viewing the movable sheave side.
Figure 6:
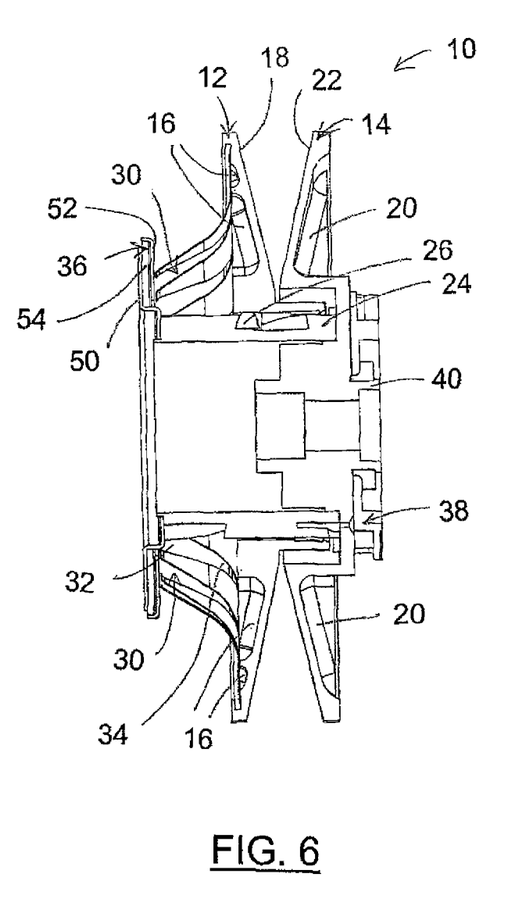
FIG. 6 is a cross-sectional side view of an exemplary clutch.

In an exemplary embodiment, the variable diameter clutch 10 has a radial diaphragm spring 30 as a biasing means for biasing the first and second sheaves 12, 14 toward each other. Radial spring 30, which is capable of elastic deformation, urges movable sheave 12 toward fixed sheave 14. The fingers 58 (see FIG. 7) extend radially inwardly from the annular portion 34 of the spring 30 and terminate at their free ends at thrust bearing 36. As shown in FIG. 6, thrust bearing 36 has an outer race 50 and an inner race 52 separated by needle bearing 54. Outer race 50 is fixed to cam 24 by bolts 56 (shown in FIG. 2). A radially inward finger portion 32 of radial spring 30 is engaged with inner race 52. Radially outward annular portion 34 of the radial spring 30 is engaged with movable sheave 12 for co-rotation therewith. Because inner race 52 rotates along with radial spring 30 and movable sheave 12, very little frictional force is transmitted between radially inward finger portion 32 and thrust bearing 36. Accordingly, the provision of thrust bearing 36 against which radial spring 30 acts serves to eliminate unnecessary wear on radially inward finger portion 32 of radial spring 30.

Figure 3:
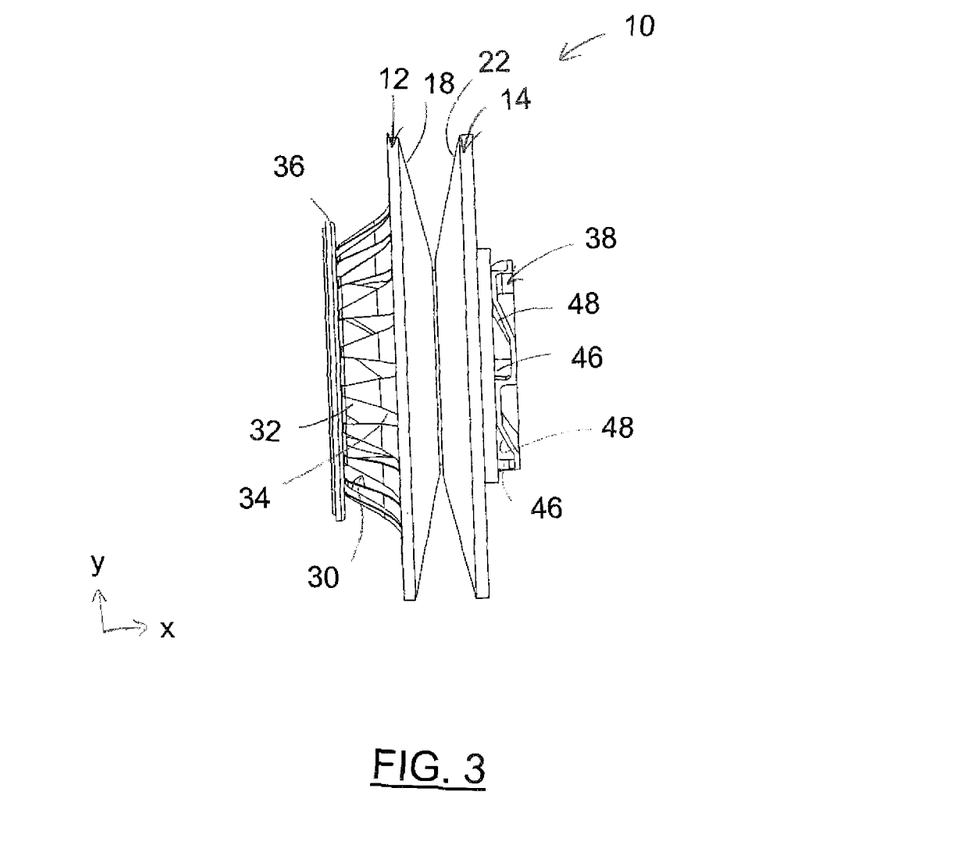
FIG. 3 is a side view of an exemplary clutch.
Figure 4:
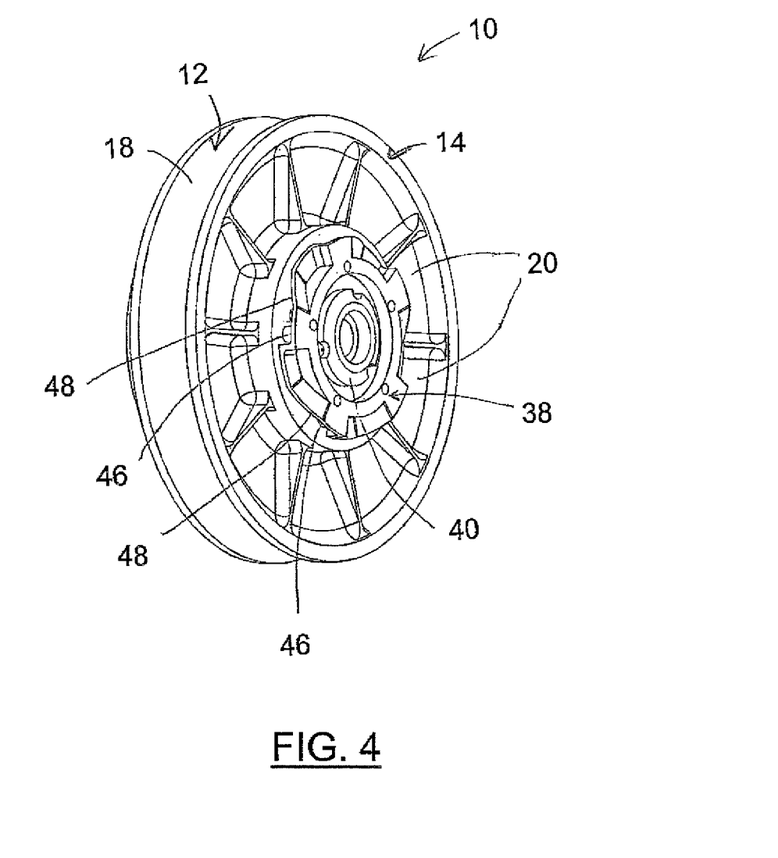
FIG. 4 is a perspective view of an exemplary clutch, viewing the fixed sheave side.
Figure 5:
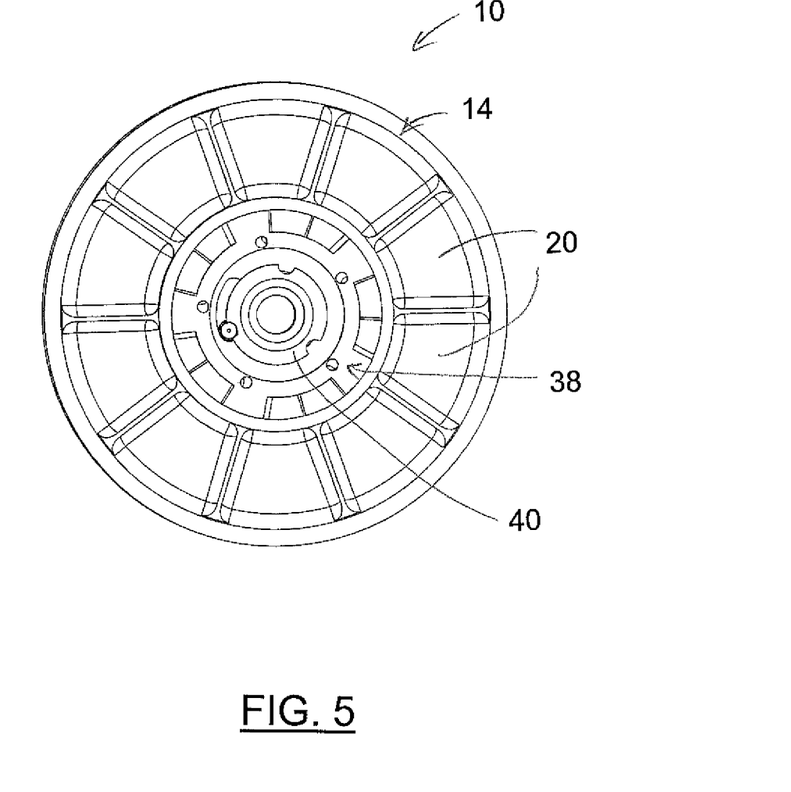
FIG. 5 is a plan view of an exemplary clutch, viewing the fixed sheave side.

The use of radial spring 30 rather than a coil spring allows clutch 10 to be about 3-4 inches narrower (see x axis dimension of FIG. 3) than a prior art driven clutch. Another feature made possible by the use of radial spring 30 rather than a coil spring is that the radial spring 30 can easily be designed to provide alternative spring rates, depending on the geometry of the radial spring 30, including, for example, the shape, number and spacing of radially inward finger portion 32 and radially outward annular portion 34. The changing geometry of radial spring 30 from radially inward finger portion 32 to radially outward annular portion 34 also allows for design of a variable rate spring. Such variability in spring rate would not be as easily achieved with a coil spring.

Moreover, the spring constant may be varied by adding layers of radial spring 30. In an exemplary embodiment, adjacent layers of radial springs 30 are rotated with respect to each other so that the fingers 58 of one radial spring overlay the spaces 60 of an adjacent radial spring (see FIG. 7). In one embodiment, the fingers 58 of one radial spring are centered relative to the spaces 60 of an adjacent radial spring.

Cam 24 is attached to stationary sheave 14 and has cam slots 28 therein. Cam followers 26, which are attached to movable sheave 12, ride within cam slots 28 to thereby move movable sheave axially and rotationally with respect to stationary sheave 14.

When clutch 10 is assembled, each cam follower 26 travels within a cam slot 28. A "cam follower" 26 as used herein may include, for example, a roller, a pad, a shaped block, a curved pin, or a like feature that is capable of engaging and moving relative to a cam slot 28. In an exemplary embodiment, cam followers 26 are shaped metal blocks and provide a low friction interface between the cam slots 28 and the followers 26. In an exemplary embodiment, cam slots 28 are substantially helical in shape. "Helical" is defined in this context as a linear shape applied to a cylindrical body. "Substantially helical" may include a linear or slightly curved shape being applied to a cylindrical or slightly conically shaped body.

When the snowmobile or other vehicle is in neutral, a V-belt (not shown) is positioned outwardly and is adjacent to the exterior circumference of the belt surfaces 18, 22 of sheaves 12, 14 of the driven or secondary clutch. During operation of the snowmobile, as power is applied to the engine, throw weights that are integral to the drive clutch act to squeeze the sheaves toward each other. The squeezing of the sheaves of the drive clutch in turn move the V-belt outwardly toward the exterior circumference of the sheaves of the drive clutch. The movement of the V-belt outwardly relative to the drive clutch sheaves in turn causes the V-belt to be drawn inwardly relative to the sheaves 12, 14 of the driven or secondary clutch 10. The sheaves 12, 14 of the driven or secondary clutch 10 then separate. The separation of the driven sheaves 12, 14 outwardly in turn causes cam followers 26 to engage and move along the cam slots 28 to shift gears for the snowmobile.

Driven clutch 10 of the present disclosure utilizes five cam followers 26 and five cam slots 28. Such a configuration is only a single representative embodiment of the invention. In alternative embodiments, seven or more cam followers 26 could be used with a corresponding number of cam slots 28 in cam 24. An odd number of cam followers 26/slots 28 is preferred because it contributes to rotational stability and minimizes binding. Such binding is caused when the movable sheave 12 does not move exactly in the direction of the x axis but instead tilts while sliding, so that the movable sheave 12 and the fixed sheave 14 are no longer parallel to one another. It is anticipated that a concentric and substantially evenly spaced arrangement of cam followers 26 and cam slots 28 would be advantageous for maintaining balance and efficiency within the clutch 10 assembly. However, an unevenly spaced arrangement may be found to be effective given modifications in other clutch assembly features, for example, the size and shape of cam 24 and the position of cam 24 relative to sheaves 12 and 14.

Figure 7:
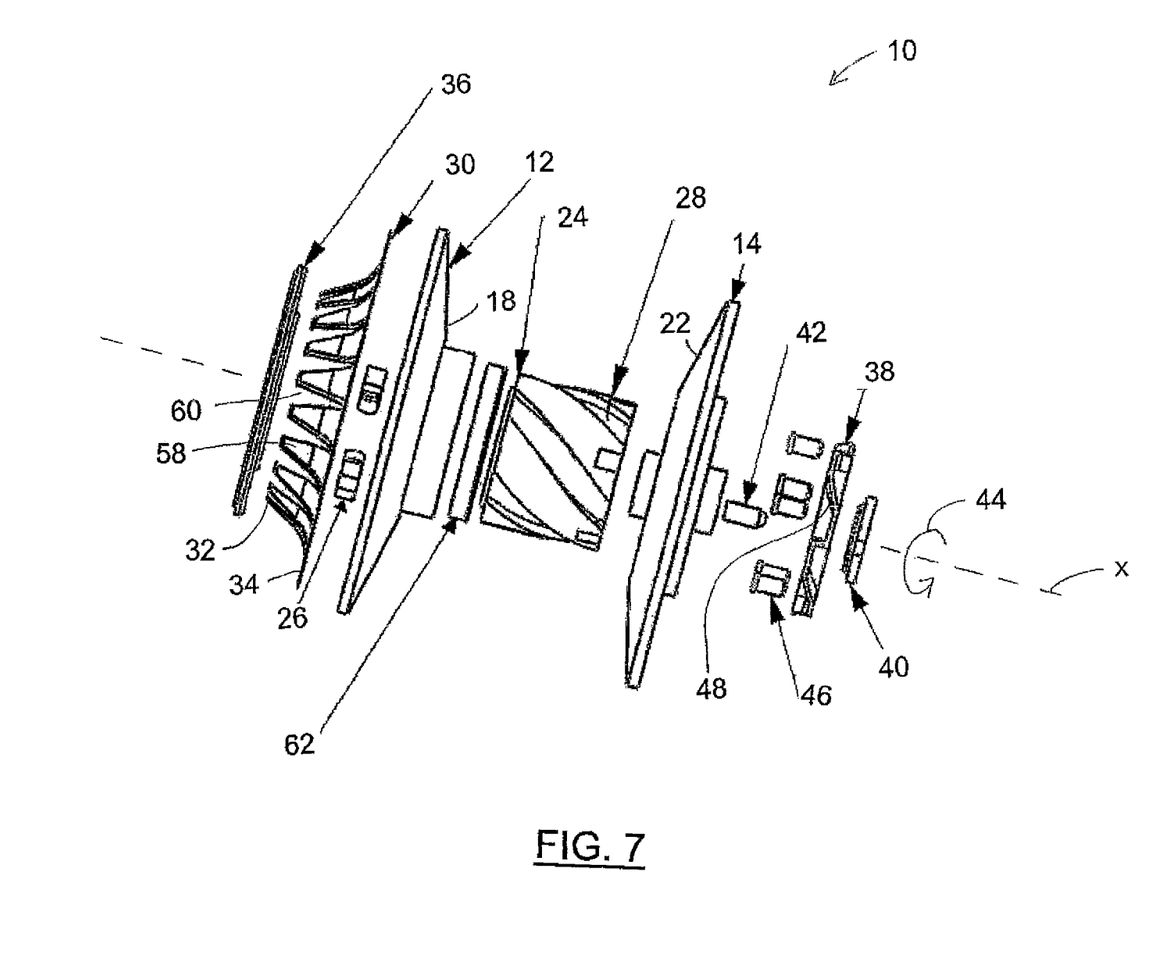
FIG. 7 is an exploded side view of an exemplary clutch.

In an exemplary embodiment, cam slots 28 have two parallel sides and maintain a constant angle with respect to the "x" axis of cam 24 (shown in FIG. 7). An exemplary range of angles with respect to the x axis is 30 degrees to 70 degrees and is dependent at least in part on anticipated load conditions. However, the angle of cam slots 28 may have more than one angle at various points along the cam slot 28 to provide specifically tailored shift patterns. In the illustrated embodiment, cam 24 forms the primary body member of clutch 10. Because no other housing is needed, the illustrated design results in fewer parts, allowing for easier and less expensive manufacture, increased durability and compactness and lighter weight.

In an exemplary embodiment, cam followers 26 are engaged with movable sheave 12 so that the movement of cam followers 26 within helical cam slots 28 not only adjusts the axial separation of the sheaves 12, 14 but also changes the rotational position of movable sheave 12 with respect to fixed sheave 14. In effect, the cam slots 28 form a bearing surface for the cam followers that move with movable sheave 12. Bushing 62 is disposed between movable sheave 12 and cam 24. Cam 24 is fixed to stationary sheave 14.

Clutch 10 may also include a belt width adjuster 38 that is held relative to cam 24 by nut 40 and detent pin 42. Rotation of adjuster 38 in rotational direction 44 permits movement of the fixed sheave 14 along the x axis relative to cam 24. This is accomplished as adjuster pins 46 move along ramps 48 as adjuster 38 is rotated in direction 44. Movement of the fixed sheave 14 relative to cam 24 adjusts the distance or spacing between the fixed sheave 14 and movable sheave 12. In other embodiments, adjuster 38 may be configured differently, while providing adjustment of the distance between the fixed sheave 14 and movable sheave 12.

Although the disclosure refers to exemplary embodiments, workers skilled in the art will recognize that changes may be made in form and detail without departing from the spirit and scope of the invention.

What is claimed is:

1. A clutch comprising:
   a stationary sheave, the sheave relatively axially stationary;
   a cam directly attached to the stationary sheave;
   a movable sheave that is axially movable relative to the stationary sheave along the cam;
   a thrust bearing comprising an outer race and an inner race, wherein the outer race is attached to the cam; and
   a first radial spring comprising a radially outward annular portion and an radially inward finger portion, wherein the radially outward annular portion is mounted on the movable sheave and wherein the radially inward finger portion bears against the inner race.

2. The clutch of claim 1 wherein the cam comprises a plurality of helical cam slots and the movable sheave is engaged with a plurality of cam followers, each of the cam followers traveling in one of the cam slots.

3. The clutch of claim 2 comprising an odd number of helical cam slots substantially evenly spaced about a periphery of the cam.

4. The clutch of claim 1 wherein the movable sheave further is rotationally movable relative to the stationary sheave along the cam.

5. The clutch of claim 1 further comprising a needle bearing disposed between the outer race and the inner race.

6. The clutch of claim 1 wherein the outer race is fixedly attached to the cam.

7. The clutch of claim 1 further comprising a second radial spring positioned adjacent the first radial spring.

8. The clutch of claim 7, wherein each of the first and second radial springs comprises a radially inward finger portion, each radially inward finger portion comprising a plurality of fingers and a plurality of spaces between the fingers, wherein the fingers of the first radial spring are rotationally offset from the fingers of the second radial spring.

9. The clutch of claim 8, wherein a finger of the first radial spring is centered relative to a space of the second radial spring.

10. The clutch of claim 1 further comprising a belt adjuster that permits movement of the stationary sheave relative to the cam.

11. The clutch of claim 10 wherein the belt adjuster comprises a plurality of adjuster pins and a plurality of ramps, wherein each adjuster pin travels along its respective ramp.

12. A clutch comprising:
   a stationary sheave, the sheave relatively axially stationary;
   a cam attached to the stationary sheave; and
   a movable sheave that is axially and rotationally movable relative to the stationary sheave along the cam.

13. The clutch of claim 12 further comprising a radial spring that biases the movable sheave toward the stationary sheave.

14. The clutch of claim 13 wherein the radial spring comprises a radially outward annular portion and a radially inward finger portion, wherein the radially outward annular portion is mounted on the movable sheave.

15. The clutch of claim 14 further comprising a thrust bearing comprising an outer race and an inner race, wherein the outer race is attached to the cam, and wherein the radially inward finger portion bears against the inner race.

16. The clutch of claim 15 further comprising a needle bearing disposed between the outer race and the inner race.

17. The clutch of claim 15 wherein the outer race is fixedly attached to the cam.

18. The clutch of claim 12 wherein the cam comprises a plurality of helical cam slots and the movable sheave is engaged with a plurality of cam followers, each of the cam followers traveling in one of the cam slots.

19. The clutch of claim 18 comprising an odd number of helical cam slots substantially evenly spaced about a periphery of the cam.

20. The clutch of claim 12 further comprising a belt adjuster that permits movement of the stationary sheave relative to the cam.

\* \* \* \* \*